United States Patent [19]

Yang et al.

[11] Patent Number: 4,514,422
[45] Date of Patent: Apr. 30, 1985

[54] NON-STALING GUM COMPOSITION AND METHOD OF PREPARATION

[75] Inventors: Robert Yang; Martin M. Rieger, both of Morris Plains, N.J.

[73] Assignee: Warner-Lambert Company, Morris Plains, N.J.

[21] Appl. No.: 333,523

[22] Filed: Dec. 22, 1981

[51] Int. Cl.$^3$ .............................. A23G 3/30
[52] U.S. Cl. ...................................... 426/3
[58] Field of Search ....................... 426/3–6, 426/321, 335

[56] References Cited

U.S. PATENT DOCUMENTS

| | | | |
|---|---|---|---|
| Re. 30,197 | 1/1980 | Klose | 426/3 |
| 3,262,784 | 7/1966 | Bucher | 426/5 |
| 3,632,358 | 1/1972 | Echeandia | 426/3 |
| 3,755,494 | 8/1973 | Chinnock et al. | 426/3 |
| 3,857,965 | 12/1974 | Ream | 426/3 |
| 3,912,817 | 10/1975 | Sapsowitz | 426/5 |
| 4,150,161 | 4/1979 | Rudolph | 426/3 |
| 4,156,740 | 5/1979 | Glass | 426/3 |

*Primary Examiner*—Jeanette Hunter
*Attorney, Agent, or Firm*—Gary M. Nath; Daniel A. Scola, Jr.

[57] ABSTRACT

The present invention relates to a gum composition exhibiting improved shelf life and resistance to staling, that comprises a substantially anhydrous mixture of a gum base, at least one sugar alcohol, and glycerin, the glycerin present in an amount ranging from greater than 10% to about 18% by weight of the composition. The gum composition preferably contains no more than 2% by weight of water. The invention includes a method for preparing the gum composition, comprising treating the ingredients thereof, including the glycerin, to remove substantially all water therefrom, thereafter combining the sugar alcohol with the glycerin under agitation and at about 50° C., and adding subsequently thereto the gum base, after which certain additive materials, such as flavorings, and the like may be added with mixing.

26 Claims, No Drawings

NON-STALING GUM COMPOSITION AND METHOD OF PREPARATION

BACKGROUND OF THE INVENTION

1. Field of the Invention

The present invention relates to sugarless gums, including chewing gums and bubble gums, and more particularly to such gums that exhibit improved resistance to staling.

2. Description of the Prior Art

Chewing gums and bubble gums have been prepared in the past, with the purpose in mind of extending shelf life. Characteristically, gums prepared and stored, even at room temperature for extended periods of time, tend to lose their moisture and elasticity, with the result that they become brittle, and initially crumble when they are placed in the mouth. This problem is particularly noticeable in the instance of sugarless gums, and particularly those gums that are stored in a dry atmosphere, i.e. an atmosphere having less than from 50 to 60% relative humidity.

Sugarless gums conventionally contain on the order of about 5% of water, and it is therefore theorized that brittleness or the phenomenon of staling results from the loss of that water, due to evaporation or otherwise, over time. Specifically, most sugarless gums contain large amounts of sorbitol, which serves conventionally as a sweetener, as well as a bulking aid. Sorbitol is known for its tendency to recrystallize in the presence of even small amounts of water, and its tendency to crystallize when the water in which it is dissolved is removed. It is therefore theorized that, as the water containing the sorbitol in the gum composition, is lost by evaporation or otherwise, the sorbitol crystallizes and thus promotes the embrittlement of the gum composition, that contributes to the staling phenomenon. Thus far, the only workable approach to prolonging gum composition freshness relied on the use of fin-seal packaging with water vapor impermeable laminates to exclude all external ambient atmosphere and accompanying moisture and conversely to prevent the egress of moisture from the package contents. This approach is very costly and has its limitations, as periodic package leakage permits staling to occur unabetted as before.

A need therefore exists to develop a gum composition that is resistant to staling and thus offers improved shelf life, without the requirement for use of air-tight sealed packaging.

SUMMARY OF THE INVENTION

In accordance with the present invention, a gum composition having improved shelf life and resistance to staling comprises a substantially anhydrous mixture of a gum base, at least one sugar alcohol, and glycerin, the glycerin present in an amount from about 8% to about 18% by weight of the gum composition. The gum composition is further characterized by containing no more than 2% by weight of water in any form. More particularly, the gum bases of the present invention may contain no more than 3.5% by weight of water, the sugar alcohols of the present invention may contain no more than 0.7% by weight of water and glycerin may contain no more than 1.0% by weight of water.

Preferably, the gum base, which may be selected from chewing gum bases and bubble gum bases, may be present in an amount by weight ranging from about 15% to about 30%, the sugar alcohols may be present in an amount ranging from about 40% to about 75% by weight, and the glycerin may be present in an amount ranging from about 8% to about 15% by weight.

The gum compositions may also contain the usual additives, such as sweeteners, plasticizers, flavorings, bulking agents, fillers, mineral adjuvants and the like.

The present invention also includes a method for preparing the gum compositions set forth above, comprising mixing the sugar alcohol with the glycerin with agitation and at an elevated temperature, adding to this anhydrous mixture, a quantity of the gum base that has been previously melted, further mixing and thereafter cooling while adding the remaining ingredients of the gum compositions under agitation.

The present method of manufacture requires substantially anhydrous conditions and preferably is performed in a dry atmosphere. Also, the gum base, glycerin and sugar alcohols are preferably treated before mixing to remove substantially all water from them.

Preferably, glycerin may be utilized in U.S.P. grade, in which form it is substantially anhydrous. The sugar alcohols utilized in the present compositions preferably comprise sorbitol, mannitol, xylitol and appropriate mixtures, and are all dried prior to blending.

The gum compositions exhibit sufficient plasticity and softness, and retain these qualities over time, without the presence of water, a known softening agent. Thus, the present compositions may be exposed to low relative humidity for extended periods of time that may range as long as one year. Flavor sensation, chewability and other properties of the gums, including film formation in the case of bubble gums, is not adversely affected by the practice of the present invention.

Accordingly, it is a principal object of the present invention to prepare gum compositions that exhibit improved shelf stability and resistance to staling.

It is a further object of the present invention to prepare gum compositions as aforesaid which do not require air-tight packaging to exhibit improved staling resistance.

It is a yet further object of the present invention to provide gum compositions as aforesaid which exhibit improved resistance to staling without diminution of the favorable characteristics of chewing gums and bubble gums.

It is a still further object of the present invention to provide a method for the preparation of chewing gums as aforesaid, which may be simply and inexpensively practiced.

It is a yet further object of the present invention to provide a method as aforesaid that effectively reduces the water content of the present gum compositions to within 2% by weight of the entire composition.

Other objects and advantages will become apparent to those skilled in the art from a review of the ensuing detailed description.

DETAILED DESCRIPTION

In one aspect, the present invention pertains to a gum composition having improved shelf life and resistance to staling or hardening, comprising a substantially anhydrous mixture of a gum base, at least one sugar alcohol, and glycerin, the glycerin present in an amount ranging from about 8% to about 18% by weight of the total gum composition. The present gum compositions contain no more than 2% of their total weight, of water in any form.

The gum bases useful in the present invention, include those gum bases utilized, respectively, for chewing gums or bubble gums. Both gum bases employ a number of elastomeric materials as part thereof. Thus, included elastomers comprise synthetic gums or elastomers such as butadiene-styrene copolymers, polyisobutylene and isobutylene-isoprene copolymers; natural gums or elastomers such as chicle, natural rubber, jelutong, balata, guttapercha, lechi caspi, sorva, guttakay, crown gum, perillo, or mixtures thereof. Among these, butadiene-styrene copolymer, polyisobutylene, isobutylene-isoprene copolymer or mixtures, are frequently used.

The gum base usually includes an elastomer solvent, which may be selected from terpene resins, such as polymers of α-pinene or β-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin and mixtures thereof.

The gum base may include a non-toxic vinyl polymer, such as polyvinyl acetate and its partial hydrolyzate, polyvinyl alcohol, and mixtures thereof. When utilized, the vinyl polymer may possess a molecular weight ranging from about 3,000 up to and including 94,000.

The base may include an oleaginous plasticizer, such as hydrogenated vegetable oil, cocoa butter, natural waxes, petroleum waxes such as the polyethylene waxes, paraffin waxes, and microcrystalline waxes with melting points higher than 80° C., or mixtures thereof. These materials may be utilized generally as softeners.

The gum base may include mineral adjuvants such as calcium carbonate, magnesium carbonate, alumina, aluminum hydroxide, aluminum silicate, talc, tricalcium phosphate and the like; as well as mixtures thereof. These mineral adjuvants may serve as fillers and texturizing agents.

Fatty acids may also be included, to serve as softeners, and suitable fatty acids would include stearic acid, palmitic acid, oleic acid, and mixtures thereof. The gum bases also frequently include emulsifiers, particularly those that would be compatible with the vinyl polymer, if included in the base. Particularly, lecithin, glyceryl monostearate, fatty acid monoglycerides, diglycerides and triglycerides, glycerol triacetate, propylene glycol monostearate and mixtures thereof may be used.

The gum base composition may also include conventional additive such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included.

Naturally, the gum bases may be prepared for a variety of products, including conventional gums and bubble gums, and the invention is not limited to a specific gum base formulation. The above description is therefore presented for purposes of illustration only. Regardless of the gum base employed, the gum composition of the present invention generally includes such gum base in an amount ranging from about 15% to 30% by weight of the total composition.

In addition to the ingredients listed above, includable within the gum base, the gum compositions may also include a variety of adjuvant materials, such as plasticizers, softeners, fillers, thickeners, and, of course, various flavors.

Useful plasticizers or softeners, include lanolin, propylene glycol, glycerol and the like, and mixtures of these, and are included optionally to achieve desired texture and consistency of the final gum composition.

Fillers such as calcium carbonate, magnesium carbonate talc, and the like, as well as those materials mentioned earlier as mineral adjuvants, may be further included in the overall gum composition to provide body to the product.

The gum compositions may also contain thickeners, that may be employed alone or in conjunction with other softeners. The thickeners may include methyl cellulose, alginates, carrageenan, xanthan gum, gelatin, carob, tragacanth, locust bean, and carboxy methyl cellulose.

Softeners or plasticizers, such as those materials set forth earlier may also be included. In addition ingredients, such as corn syrup, sugar alcohols such as sorbitol, mannitol and xylitol as well as hydrolyzed cereal solids, are contemplated and may be included herein.

The gum compositions may contain a variety of flavors alone or in mixture with each other, depending upon the type of gum it is desired to prepare. Particularly, flavors useful in the present invention include essential oils, such as cinnamon, spearmint, peppermint, birch, anise and the like; natural fruit flavors derived from the essence of fruits, such as apple, pear, peach, strawberry, cherry, apricot, orange, watermelon, banana and the like; bean-derived flavors, such as coffee, cocoa and the like; wine-derived flavors, such as curacao zin and the like; and pungent materials, such as affinin, pepper, mustard and the like. The flavor component is added in a range of from about 0.6% to about 1.5% by weight of the entire gum composition, and typically is present in an amount of about 1.0%.

The gum compositions generally contain a sweetener which frequently comprises a large proporition by weight of the entire gum composition, particularly in the instance where bubble gum compositions are being prepared. In the instance of sugar sweetened gum, the sweetener comprises sugar, including sucrose, glucose (corn syrup), dextrose, invert sugar, fructose and mixtures thereof. In the instance where a sugarless bubble gum is prepared, the sweetener comprises a sugar substitute, including saccharin and its various salts such as the sodium or calcium salts; cyclamic acid and its various salts such as the sodium salt; the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also, the nonfermentable sugar substitute (hydrogenated starch hydrolysate) described in U.S. Pat. No. Re. 26,959, may be utilized, as well as the synthetic sweetener 3,4-dihydro-6-methyl-1,2,3-oxathiazin-4-one-2,2-dioxide, including its potassium sodium and calcium salts, all described in German Pat. No. 2,001,017.7. Any of the foregoing sweeteners may be present alone or in combination with each other, within the scope of the present invention.

As mentioned earlier, the sugar alcohols including sorbitol, xylitol, mannitol and the like, are utilized not only as sweeteners, particularly in the instance of sugar-free gum compositions, but also serve as bulking agents, and therefore frequently comprise a major amount by weight of the total composition. In particular, the sugar alcohols may comprise as much as 75% by weight of the total gum composition, and it is in this area that the difficulty with staling has been observed. Specifically, gum compositions conventionally contain a significant percentage of water, that is included as a softener, and is frequently added together with the sugar alcohols during the final preparation of the composition. The loss of water over time, particularly in atmospheres of low relative humidity, causes the sorbitol to crystallize and, as noted earlier, contributes to the hardening of the gum compositions and the resulting staling sensation.

In accordance with the present invention, water is all but entirely deleted from the present compositions, and glycerin is added in amounts ranging from about 8% to about 18% by weight of the total composition. Preferably, glycerin is provided in anhydrous form, such as commercially available in the United States Pharmacopoeia (USP) grade. Glycerin is available as a syrupy liquid with a sweet warm taste, that offers a sweetness of about 60% that of cane sugar. As glycerin readily absorbs moisture, it is critical that the anhydrous glycerin utilized in the present invention be maintained under substantially anhydrous conditions throughout the preparation of the present gum composition.

Preferably, glycerin is present in amounts ranging from about 8% to about 15% by weight, and contains water in an amount by weight that does not exceed 1.0%. The sugar alcohols of the present invention set forth above, should likewise contain water in an amount by weight that does not exceed 0.7%, and the gum base may include water in an amount not exceeding 3.5% by weight.

In a preferred embodiment of the present invention, a gum composition is prepared that comprises a gum base selected from chewing gum bases and bubble gum bases, in an amount ranging from about 15% to about 30% by weight, flavor in an amount ranging from about 0.6% to about 1.5% by weight, glycerin in an amount ranging from about 8% to about 15% by weight, and the balance comprising a sugar alcohol selected from the group consisting of sorbitol, mannitol, xylitol and mixtures thereof. The gum composition is a substantially anhydrous mixture of the above ingredients, and contains no more than 2% by weight thereof, of water in any form.

The present invention includes a method for preparing a gum composition, including both chewing gum and bubble gum formulations, comprising preparing the ingredients of the gum composition to remove all water therefrom, to yield substantially anhydrous starting materials. Thus, the gum base and the sugar alcohols may be dried by heating under vacuum. In particular, the gum base, which is conventially previously melted at temperatures that may range from about 90° to about 100° C. should be heated at a temperature ranging from about 80° to about 90° C. at a vacuum less than about 400 mm Hg, for a period of time sufficient to render the base substantially anhydrous. For example, the gum base may be heated under these conditions for a period of about thirty minutes just prior to mixing with the remaining ingredients of the gum composition.

The glycerin, as noted earlier, should be provided in anhydrous form. Both the glycerin and the sugar alcohol component may be dried in similar fashion to the gum base, by heating, for example, at a temperature ranging from about 60° to about 70° C. under a vacuum less than about 40 mm Hg, to remove any trace amounts of water. If pre-drying is practiced, it should be conducted overnight, and just prior to the formulation of the present gum composition. Pre-drying is not necessary, however, if the materials are provided initially in dry form as defined herein.

After the foregoing materials are treated as described above, the sugar alcohols, in the event that a mixture is utilized, are heated to a temperature of about 50° C. while undergoing agitation or mixing, for a period of time such as three minutes. For example, sorbitol and mannitol may be combined and blended in this fashion.

The glycerin is then added to the above mixture, and mixing is continued at the same temperature for a period of time sufficient to form a uniform mixture of the ingredients, and preferably for about eight minutes. Thereafter, the gum base, previously melted as indicated, and maintained under vacuum just prior thereto, may be added to the resulting mixture, and mixing may thereafter continue for a further period sufficient to form a homogeneous mixture of all ingredients added thus far. Thus, for example, mixing may be continued for a period of time of about ten minutes. Finally, heating is discontinued, and the remainder of the ingredients to be added to the composition, including the flavoring, colorant if any, and other adjuvants, are added, and the resulting composition is then mixed for a period of time, that may range as high as thirty minutes, to form a fully uniform composition. The mass is then removed from the mixer and is allowed to cool further, and may thereafter be formed into various final shapes by known gum manufacturing techniques. For example, the mass may be rolled in contact with a conventional dusting medium, such as calcium carbonate, mannitol, talc and others.

The gum compositions of the present invention may be prepared into all of the various end forms known commercially, including slab form, cube form and center-filled form. All of the techniques associated with the preparation of the products in these forms, are known per se, and the present method may vary somewhat, depending upon the specific end product to be manufactured without departing from the essential parameters relating to the exclusion of water. Such other details are presented for purposes of illustration, and to provide a best mode for the practice of the invention, and therefore the invention should not be limited to those parameters.

While the present invention is broadly applicable to the preparation of gum compositions resistant to staling, it finds particular utility in the instance where sugar-free gum compositions are contemplated. These compositions, as noted earlier, frequently contain large amounts of the sugar alcohols such as sorbitol and are therefore most susceptible to staling in the manner described earlier.

For example, a sugarless water-free chewing gum may be prepared from an anhydrous mixture of the following ingredients in the amounts set forth below.

| INGREDIENT | WEIGHT % |
| --- | --- |
| Gum Base (dried) | 15-30 |
| Glycerin (anhydrous) | 8-18 |
| Sorbitol (dried) | 40-75 |
| Flavor Oil q.s. | 0.6-1.5 |

A preferred sugarless chewing gum composition contains the following ingredients, in the amounts, also expressed as weight percent.

| INGREDIENT | WEIGHT % |
| --- | --- |
| Gum Base (dried) | 19–26 |
| Glycerin (anhydrous) | 10–13 |
| Sorbitol (dried) | 60–70 |
| Flavor Oil q.s. | 1.0 |

The foregoing compositions and their respective ranges may naturally be varied by the inclusion of adjuvant materials, such as those described earlier herein.

The present invention will be better understood from a consideration of the following illustrative examples.

EXAMPLE I

A sugarless chewing gum composition was prepared which contained the following ingredients, in amounts expressed by weight percent.

| INGREDIENT | WEIGHT % |
| --- | --- |
| Gum Base | 20.7% |
| Glycerin (U.S.P.) | 13.5% |
| Mannitol | 18.2% |
| Sorbitol | 46.1% |
| Cinnamon Flavor | 1.5% |

The gum composition was prepared by blending the sorbitol and mannitol in a mixer heated to 50° C., for three minutes. Prior to blending, the sorbitol and mannitol were dried under a vacuum of less than 40 mm Hg and a temperature ranging from about 60° to about 70° C., overnight, to remove trace amounts of water. Thereafter, the glycerin, that had been dried in similar fashion, was added to the mixture of sorbitol and mannitol, and all ingredients were thereafter mixed for an additional eight minutes. The gum base, that had been prepared under a dry atmosphere and heated under low vacuum at a temperature of from about 80° to about 90° C. for approximately thirty minutes prior, was then added to the resulting mixture of glycerin and sugar alcohols, and the resulting combination of ingredients was mixed for a further ten minutes. Thereafter, heating of the mixture was discontinued, the cinnamon flavor was added, and the mass was then mixed for an additional thirteen minutes. Thereafter the mass was removed from the mixer, permitted to cool and rolled in the presence of calcium carbonate to form the final gum product.

A gum product having a similar composition was stored at 0% relative humidity for a period of one year, and when tested by chewing thereafter, was found to retain its flexibility and organoleptic acceptability.

EXAMPLES II AND III

The following gum compositions were prepared, and comprise respectively, a chewing gum composition and a bubble gum composition. Both compositions are set forth individually, below.

TABLE I

| REGULAR CHEWING GUM | |
| --- | --- |
| INGREDIENT | WEIGHT % |
| Gum Base | 21% |
| Glycerin | 13.5% |
| Sorbitol | 30.1% |
| Mannitol | 8.0% |
| Xylitol | 26.5% |

TABLE I-continued

| REGULAR CHEWING GUM | |
| --- | --- |
| INGREDIENT | WEIGHT % |
| Flavor | 1.0% |

TABLE II

| BUBBLE GUM | |
| --- | --- |
| INGREDIENT | WEIGHT % |
| Bubble Gum Base | 18% |
| Glycerin | 13.5% |
| Sorbitol | 32.5% |
| Mannitol | 8.0% |
| Xylitol | 27.0% |
| Flavor | 1.0% |

Each of the above formulations was prepared in accordance with the method outlined in the present specification, and Example I above. Particularly, the gum base was prepared to a water content of less than 3.5%, the glycerin was prepared with a water content of less than 1.0% and the sugar alcohols were prepared to possess water contents, respectively, of less than 0.7%. Both compositions represent essentially sugarless gum formulations, and exhibited the favorable improvement in resistance to staling, noted with respect to the composition of Example I.

As noted earlier, the present gum compositions and associated methods of their preparation, are particularly useful in the instance where the gum product is stored for extended periods of time in conventional packaging, in atmospheres having a low relative humidity, i.e. a relative humidity of less than 50–60%. In the instance where the relative humidity exceeds this level, conventional gum preparations and their associated conventional packaging is adequate, as water loss is substantially reduced.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A chewing gum composition having improved resistance to staling, comprising a substantially anhydrous mixture of a gum base, at least one sugar alcohol and glycerin present in an amount ranging from greater than about 10% to about 18% by weight of the chewing gum composition, wherein the gum base possesses a water content of less than 3.5% by weight, the glycerin possesses a water content of less than 1% by weight, the sugar alcohol possesses a water content of less than 0.7% and wherein said chewing gum composition contains no greater than 2% by weight thereof, of water in any form.

2. The chewing gum composition of claim 1 wherein said glycerin is present in an amount ranging from greater than about 10% to about 15% by weight.

3. The chewing gum composition of claim 1 wherein said gum base is selected from the group consisting of chewing gum bases and bubble gum bases.

4. The chewing gum composition of claims 1 or 3 wherein said gum base is present in an amount ranging from about 15% to about 30% by weight of said gum composition.

5. The chewing gum composition of claim 1 wherein said sugar alcohols are selected from the group consisting of sorbitol, mannitol, xylitol and mixtures thereof.

6. The chewing gum composition of claim 5 wherein said sugar alcohols comprise a mixture of sorbitol and mannitol.

7. The chewing gum composition of claim 5 wherein said sugar alcohols comprise sorbitol alone.

8. The chewing gum composition of claims 1, 5, 6 or 7 wherein said sugar alcohols are present in an amount ranging from about 40% to about 75% by weight of said chewing gum composition.

9. The chewing gum composition of claim 1 further including at least one additive selected from the group consisting of sweeteners, plasticizers, flavorings, bulking agents, fillers, mineral adjuvants, and mixtures thereof.

10. The gum composition of claim 9 wherein a flavoring is present in an amount ranging from about 0.6% to about 1.5% by weight of said composition.

11. A chewing gum composition having improved resistance to staling, consisting essentially of a substantially anhydrous mixture of the following ingredients, expressed in weight percent:
   a. from about 15% to about 30% by weight of a gum base;
   b. from greater than about 10% to about 15% by weight of glycerin;
   c. from about 40% to about 75% by weight of a sugar alcohol selected from the group consisting of sorbitol, mannitol, xylitol and mixtures thereof; and
   d. from about 0.6% to about 1.5% by weight of a flavoring;
wherein said chewing gum composition contains a maximum of 2% by weight of water.

12. The chewing gum composition of claim 11 wherein sorbitol is present in an amount not exceeding 70% by weight, mannitol is present in an amount not exceeding 15% by weight, and xylitol is present in an amount not exceeding 65% by weight.

13. The chewing gum composition of claim 11 wherein said sugar alcohol comprises sorbitol in an amount ranging from about 40% to about 75% by weight.

14. A method for preparing a chewing gum composition having improved resistance to staling comprising:
   a. providing in substantially anhydrous form a gum base possessing a water content of less than 3.5% by weight; at least one sugar alcohol possessing a water content of less than 0.7% by weight; and glycerin in an amount of from greater than about 10% to about 18% by weight of said chewing gum composition, said glycerin possessing a water content of less than 1% by weight;
   b. mixing said glycerin and said sugar alcohol under agitation and at a temperature of about 50° C.;
   c. adding said gum base to the mixture of step b and continuing agitation to form a uniform mixture;
   d. allowing the mixture to cool; and
   e. forming the mixture into a chewing gum product containing no greater than 2% by weight thereof, of water in any form.

15. The method of claim 14 wherein, prior to Step b, said sugar alcohols and said glycerin are dried to remove trace amounts of water.

16. The method of claim 15 wherein said sugar alcohols and said glycerin are dried at a temperature ranging from about 60° to about 70° C. under vacuum, and for a period of time on the order of eight hours.

17. The method of claim 14 wherein said gum base is heated at a temperature ranging from about 80° to about 90° C., and at a low vacuum, for a period of time just prior to the performance of Step c.

18. The method of claim 17 wherein said gum base is heated for a period of time of about thirty minutes.

19. The method of any one of claims 14–17 or 18, wherein said chewing gum base is present in an amount by weight of said gum composition, ranging from about 15% to about 30%.

20. The method of claim 14 wherein sugar alcohol is selected from the group consisting of sorbitol, mannitol, xylitol and mixtures thereof.

21. The method of any one of claims 14–17 or 20 wherein said sugar alcohols are present in an amount by weight of said chewing gum composition, ranging from about 40% to about 75%.

22. The method of claim 19 wherein said sugar alcohols are present in an amount by weight of said gum composition, ranging from about 40% to about 75%.

23. The method of claim 14 wherein after Step c, heating is discontinued and at least one flavoring is added to the mixture.

24. The method of claim 23 wherein said flavoring is added in an amount by weight of said composition, ranging from about 0.6% to about 1.5%.

25. The method of claim 24 wherein, after said flavoring is added and thoroughly mixed therewith, the resulting mixture is permitted to cool and is rolled in the presence of a dusting medium to form said gum product.

26. A method for inhibiting the staling and embrittlement of chewing gum compositions, comprising adding thereto a quantity of glycerin in an amount ranging from greater than about 10% to about 18% by weight of said gum composition, treating the ingredients of said gum composition, including said glycerin, to remove substantially all water therefrom, and preparing said gum composition including said glycerin under substantially anhydrous conditions.

* * * * *

UNITED STATES PATENT AND TRADEMARK OFFICE
CERTIFICATE OF CORRECTION

PATENT NO. : 4,514,422

DATED : April 30, 1985

INVENTOR(S) : Robert Yang, et al

It is certified that error appears in the above-identified patent and that said Letters Patent are hereby corrected as shown below:

Column 10, claim 19, line 2, delete "chewing".

Column 10, claim 19, line 3, change "said gum composition" to read --said chewing gum composition--.

Signed and Sealed this

Seventeenth Day of September 1985

[SEAL]

Attest:

Attesting Officer

DONALD J. QUIGG

Commissioner of Patents and Trademarks—Designate